United States Patent
Nakajima

[11] 3,764,803
[45] Oct. 9, 1973

[54] MASS SPECTROMETER
[75] Inventor: Yasuo Nakajima, Katuta-shi, Japan
[73] Assignee: Hitachi, Ltd., Tokyo, Japan
[22] Filed: May 27, 1971
[21] Appl. No.: 147,313

[52] U.S. Cl. 250/41.9 D, 250/41.9 ME, 250/41.9 G
[51] Int. Cl. .......................................... H01j 39/34
[58] Field of Search............... 250/41.9 ME, 41.9 D, 250/41.9 SR, 41.9 G

[56] References Cited
UNITED STATES PATENTS
2,947,868  8/1960  Herzog...................... 250/41.9 ME
3,471,692  10/1969  Llewellyn...................... 250/41.9 G Primary Examiner—James W. Lawrence
Assistant Examiner—C. E. Church
Attorney—Craig, Antonelli and Hill

[57] ABSTRACT

A mass spectrometer comprising an ionization chamber, an ion accelerator, a magnetic analyzer, and a collector for obtaining a mass spectrum, which collector is connected to an indicator; wherein a deflecting electrode for supplying accelerated ions to an electron multiplier at a certain definite cycle for a certain definite period is disposed between said ion accelerator and magnetic analyzer, which electron multiplier determines the total ion current.

10 Claims, 3 Drawing Figures

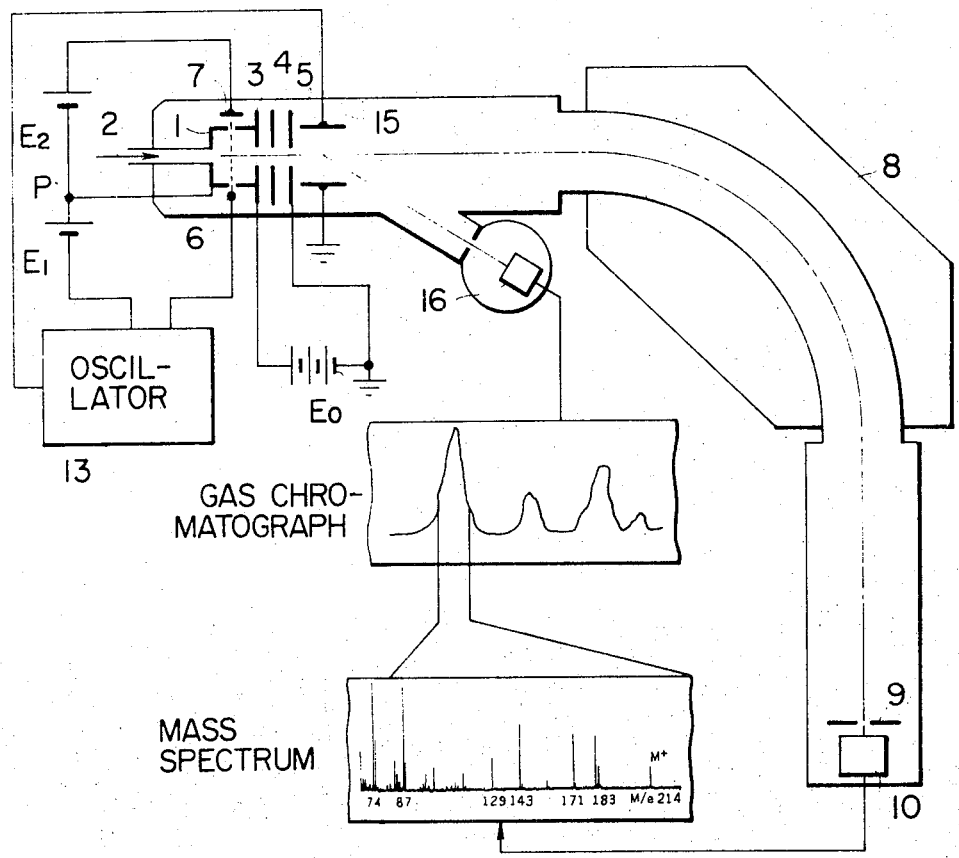

MASS SPECTROMETER

BACKGROUND OF THE INVENTION

This invention relates to improvements in mass spectrometers, and more particularly to mass spectrometers in which a device for deflecting the ion beam is disposed in the detector for measuring the total ion current of a sample.

The mass spectrometer is a mass spectrum measuring instrument in which the sample to be analyzed is ionized and accelerated to form an ion beam for analysis according to its mass by using an electric field or magnetic field.

Recently, with rapid development in the industry in general, attainment of higher accuracy in the measurement of mass spectrum has become a major aim. Today, the spectrometer is required to be capable of accurately measuring even a very small peak of a mass spectrum. To this end, the state of ionization, i.e., the state of how an ion is produced must be accurately observed. In the conventional mass spectrometer, an ion monitoring electrode is used and part of the ion beam is directed to the electrode whereby the total ion current is measured.

In this type of spectrometer, the quantity of the ion beam directed to the ion monitoring electrode must be sufficient to observe the ionization state, i.e., to measure even a very small change in the total quantity of ions. However, increasing the quantity of ions supplied to the ion monitoring electrode decreases the magnitude of the ion beam directed to the analyzer and, as a result, the spectrum analyzing accuracy is lowered. The mass spectrometer of today is designed so that an electric field or magnetic field produced in the mass analyzer is changed, and the ion absorbed by the collector through a certain specific slit is amplified whereby a mass spectrum is obtained. In such a spectrometer, the ratio of the quantity of the ion beam absorbed by the ion monitoring electrode to the quantity of ion beam supplied to the mass analyzer is kept constant. In spite of this arrangement, the ratio of the ion beam is varied when the electric field or magnetic field provided in the mass analyzer is scanned. The ratio of the ion beam is varied also by the magnetic field of the source magnet provided in the ion source. In the prior art, said ratio of the ion beam is assumed to be constant and the total ion is calculated from the ion current flowing in the ion monitoring electrode. Hence, the variation in the ratio of the ion beam exists directly as the measuring error and lowers the measuring accuracy.

In some cases, an accurate measure of the total quantity of the ion beam is necessary depending upon the sample to be analyzed. As described, the ion current is caught by the monitoring electrode and amplified by an amplifier. The amplifier often involves drift and internal noise and is hardly capable of maintaining a satisfactory amplification factor. This makes it difficult to obtain an accurate measure of the total quantity of the ion beam.

While, to increase the sensitivity, the use of an electron multiplier is desirable. In the prior art, however, part of the ion beam is detected. In such a structure, the size of the electron multiplier is too large to fit in the apparatus. Furthermore, the main beam is deflected by a high voltage (Usually, $-1,000$ to $-3,000$) applied between the electrodes of the electron multiplier. This high voltage often affects normal operation for detecting the mass spectrum.

Recently, the mass spectrometer has been in use in direct combination with the gas chromatograph. In this system, the total ion monitor of the mass spectrometer is used for chromatographic measurement and recording. According to the prior art, however, part of the carrier gas enters the ion chamber together with the sample, which causes a problem in that the carrier gas in the ion chamber varies with lapse of time, thereby to vary the base line of the chromatogram.

A method for solving this problem is proposed in U.S. Pat. No. 3,430,040. According to this method, part of the ion beam is caught by the ion monitoring electrode and amplified by an electrical amplifier. The ratio of the ions caught by the ion monitoring electrode to the total ions is changed by the magnetic field of the source magnet of the ion source, as well as by the magnetic field of the mass analyzing magnet. The carrier gas from the gas chromatograph is largely deflected by the magnetic field because the mass of the carrier gas is small. Furthermore, in the proposed method, an electrical amplifier is used to amplify the ion current caught by the ion monitor and, as a consequence, a sufficient amplification factor can hardly be obtained. In addition, the prior art does not make simultaneous measurement of gas chromatograph and mass spectrum available.

SUMMARY OF THE INVENTION

The first object of this invention is to provide a mass spectrometer in which the ratio of the quantity of ions caught by the ion monitoring electrode to the total quantity of ions is kept constant by the magnetic field of the source magnet provided in the ion source and of the mass analyzing magnet.

The second object of the invejtion is to provide a mass spectrometer in which an electron multiplier can be used for the monitoring amplifier.

The third object of the invention is to provide a mass spectrometer in which the ratio of the quantity of ions caught by the monitoring electrode to the total quantity of ions can easily be changed with a high accuracy.

The fourth object of the invention is to provide a mass spectrometer capable of gas chromatographic measurement without being affected by the carrier gas when the spectrometer is used directly with a gas chromatograph.

The fifth object of the invention is to provide a mass spectrometer capable of simultaneous measurement of a gas chromatograph and a mass spectrum when the spectrometer is used in direct combination with a gas chromatograph.

The gas spectrometer realized with the above objects in view is characterized in that an electrode for deflecting the ion beam is disposed in part of the ion beam path, a square-wave pulse voltage is applied to said deflecting electrode, thereby intermittently deflecting the ion beam from its path, and the deflected ion beam is caught by a collector disposed on the ion beam deflecting path. In this mass spectrometer, the quantity of ions caught by the mass spectrum measuring collector and that caught by the ion monitoring collector are determined by the ratio of the periods of time for which the ions are deflected toward the individual collectors. In this structure, therefore, the ion beam is not affected by the source magnet of the ion source or by the mass analyzing magnet and thus the mass spectrum is accurately measured.

For accurate measurement of variation in the total ion current according to this invention, an electron multiplier is used for the monitoring collector, and the collected ion current is amplified at a high amplification factor (e.g., $10^6$). As a result, even a very small variation in the total ion current can be accurately measured.

In the mass spectrometer used in direct combination with a gas chromatograph, the electron accelerating voltage for ionization is changed, being synchronized with the periodic deflection of ion beam, whereby a gas chromatograph and a mass spectrum are simultaneously measured free from influence of the carrier gas.

More specifically, in the gas chromatograph, a carrier gas is used. Hence, if the sample is ionized at an accelerating voltage at which the carrier gas is not ionized, only the sample to be anaylzed can be ionized without ionizing the carrier gas. At such accelerating voltage, the total ions proportional to the quantity of the sample supplied from the column is measured by the ion monitor. According to this method, however, the accuracy of the mass spectrum measurement is lowered because the ionization rate is small. In the measurement of the mass spectrum, the ions of the carrier gas are cut by the collector slit and, accordingly, the measuring accuracy is free of the influence of the carrier gas. For the measurement of the mass spectrum, the ionizing voltage must be high enough. While, for the measurement of the total ions by the use of an ion monitor, the ionizing voltage must be lower than the voltage at which the carrier gas is ionized.

Taking the above conditions into consideration, the invention realizes an apparatus comprising a mass spectrometer in direct combination with a gas chromatograph, characterized in that the electron accelerating voltage is of a square-wave pulse voltage having two levels, one being below the carrier gas emergence voltage and the other being above the carrier gas emergence voltage, the ion beam is deflected toward the ion monitor side in synchronism with said square-wave pulse voltage when said electron accelerating voltage is below the carrier gas emergence voltage, or the ion beam is not deflected but driven along its normal path when said electron accelerating voltage is above the carrier gas emergence voltage and thus the base line drift of the gas chromatogram recorded for the spectra detected by the ion monitor is compensated without affecting the mass spectrometer in its sample analysis operation.

The electron accelerating voltage is a voltage applied between the filament and ionization chamber for the purpose of accelerating the electrons when a certain substance is ionized by bombardment of thermal electrons. Strictly, this voltage is somewhat different from the ionizing voltage for providing electron energy for ionization. For explanatory simplicity, the electron accelerating voltage is considered to be similar to the ionizing voltage in this specification.

BRIEF DESCRIPTION OF THE DRAWING

FIG. 2 illustrates a mass spectrometer of this invention used in direct combination with a gas chromatograph.

DESCRIPTION OF THE PREFERRED EMBODIMENTS

Figure 1:
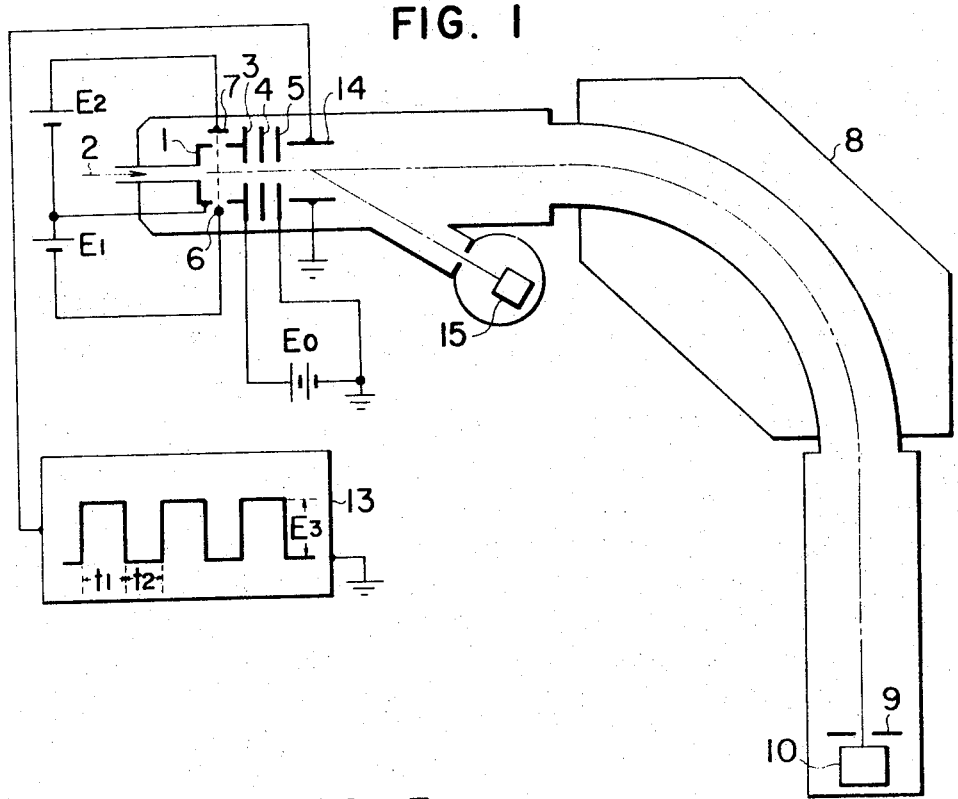
FIG. 1 is a schematic diagram showing the principle of a mass spectrometer embodying this invention.

Referring to FIG. 1, there is shown a mass spectrometer of this invention wherein there is provided an ionziation chamber 1 into which a gasified sample is introduced via a sample inlet 2. The reference 3 denotes an acceleration slit whose potential is the same as that of the ionization chamber, and 4 a focus slit for focusing the ion beam on an exit slit 5 which stands at ground potential. Generally, this focus slit 4 receives a voltage a little lower than the voltage applied to the acceleration slit 3. An ion beam accelerating voltage $Eo$ (selectable in several steps in the range between 450 and 3,600V according to the value of the measuring mass) is applied between the accelerating slit 3 and exit slit 5. The reference 6 represents a filament which is fixed-biased for a suitable electron accelerating voltage $E_1$ of $-50$ to $-100V$ with respect to the potential of the ionization chamber 1. By this voltage $E_1$ (normally 70V), the electrons generated from the filament are accelerated and supplied to a trap 7 in which the given sample is ionized. This trap 7 is kept at a voltage (normally 30 to 40V) which is higher by voltage $E_2$ than that of the ionization chamber 1.

The sample introduced into the ionization chamber 1 via the sample inlet 2 is ionized by said electron accelerating voltage, and the resultant ion beam is analyzed for mass by a magnetic field generator 8 and detected by an ion collector 10 through a collector slit system 9. The detected ion beam is amplified by a suitable amplifier system, and the resultant mass spectrum is recorded on a recorder.

The reference 14 denotes a deflecting electrode disposed immediately after the exit slit 5. A positive voltage pulse $E_3$ is applied to said deflecting electrode 14 from a square-wave pulse generator 13. The reference 15 denotes an ion monitor/detector system comprising an ion detector, such as an electron multiplier. This system is disposed on the path of the ion beam deflected by said deflecting electrode.

In the mass spectrometer arranged as above, the ion beam is deflected toward the ground side of the deflecting electrode 14 when the square-wave voltage applied to the deflecting electrode 14 from the square-wave pulse generator 13 is of positive voltage $E_3$. The deflected ion beam enters the ion monitor/detector system 15.

While, when the square-wave voltage applied to the deflecting electrode 14 is of zero potential (i.e., ground potential), the ion beam is not deflected but directed to the magnetic field 8 whereby the ion beam is analyzed with respect to mass. The ratio of the quantity of ions supplied to the ion monitor/detector system to the quantity of ions supplied to the analyzer system can be arbitrarily changed by changing the pulse widths $t_1$ and $t_2$ of the square-wave voltage.

The square pulse voltage $E_3$ may be suitably determined according to the length of the deflecting plate of the deflecting electrode and also the deflecting angle.

As described above, the mass spectrometer according to this invention is operated in such manner that a square-wave pulse voltage having two levels is applied to the deflecting electrode disposed at a position along the ion beam path, one of these two levels being sufficient to deflect the ion beam to a desired value and the other one of which being at zero potential (ground potential), whereby the ion beam is intermittently deflected, and thus the ion is detected and recorded by the use of an ion monitor/detector system. This spectrometer is capable of ion monitoring at a high sensitivity, without lowering the detection sensitivity due to decrease in the quantity of ion supplied to the analyzer system, unlike the prior art in which part of the ion beam is cut for monitoring.

According to the invention, an electron multiplier, whose amplification factor and sensitivity are great, can be used for the ion monitor/detector system. In addition, the electron multiplier can be installed at a position distant from the main beam path. This makes it possible to eliminate the problem that the main ion beam is deflected by the high voltage applied between the electrodes of said multiplier.

In the above embodiment, the ion beam is formed of positive ions. It is apparent that the invention is not limited to positive ions but is also applicable to a negative ion beam.

The above-described mass spectrometer is of the single convergence type in which the deflecting electrode is located immediately after the exit slit of the ion source. It is apparent that the invention is also applicable to the double convergence type in which the velocity convergence of the ion beam in an electrostatic field and the directional convergence in a magnetic field are utilized. In this application, the deflecting electrode may be located in a suitable position between the electrostatic field and the magnetic field.

Referring to FIG. 2, there is shown a mass spectrometer of this invention used in direct combination with a gas chromatograph. In this embodiment, the electron accelerating voltage for ionization is changed in synchronism with ion beam deflection whereby the influence of the carrier gas is removed.

In FIG. 2, the reference 1 denotes an ionization chamber into which the sample separated by the gas chromatograph is led from a sample inlet 2 by way of a carrier gas separator. The reference 3 represents an acceleration slit kept at the same potential as the ionization chamber 1, and 4 designates a focus slit for focusing the ion beam on an exit slit 5 which stands at ground potential. Generally, this focus slit 4 receives a voltage which is a little lower than the voltage applied to the acceleration slit 3. An ion beam accelerating voltage E$o$) selectable in several steps from 450 to 3,600V according to the value of the measuring mass) is applied between the acceleration slit 3 and exit slit 5. The reference 6 represents a filament which is fixed-biased for a suitable electron accelerating voltage $E_1$ of −50 to −100V with respect to the potential of the ionization chamber 1. By this voltage $E_1$ (normally 70V), the electrons are accelerated and supplied to a trap 7 in which the given sample is ionized. This trap 7 is kept at a voltage (normally 30 to 40V) which is higher by voltage $E_2$ than that of the ionization chamber 1.

The sample introduced into the ionization chamber 1 via the sample inlet 2 is ionized by said electron accelerating voltage, and the resultant ion beam is analyzed for mass by a magnetic field 8 and detected by an ion collector 10 through a collector slit 9. The detected ion beam is amplified by a suitable amplifier system and then recorded as a mass spectrum on a recorder.

The electron accelerating voltage $E_1$ applied between the filament 6 and ionization chamber 1 is sufficient for ionizing the sample gas and carrier gas.

A square-wave voltage $E_3$ supplied from a square-wave pulse generator 13 is superposed on the DC voltage $E_1$ with reverse polarity. By this means, the electron accelerating square-wave voltage applied between the ionization chamber and filament is provided in two levels, $E_1$ (=70V) and $E_1−E_3$ (=20V). When the voltage ($E_1−E_3$) is determined to be lower (for example, 20V) than the carrier gas emergence voltage (about 24V in case of helium), and the voltage $E_1$ is the normal electron accelerating voltage (for example, 70V), the carrier gas is not ionized during operation where ($E_1−E_3$) is applied as the electron accelerating voltage, or both the sample gas and carrier gas are ionized during operation where $E_3$ is applied as the electron accelerating voltage. Synchronizing with said electron accelerating voltage, the square-wave voltage from the square-wave pulse generator 13 is applied to the deflecting electrode 15 disposed immediately after the exit slit 5. Namely, when the electron accelerating voltage is ($E_1−E_3$), the positive pulse of amplitude voltage $E_3$ is applied to the deflecting electrode 15. While, when the electron accelerating voltage $E_1$ is applied thereto, the deflecting electrode 15 stands at ground potential.

According to this embodiment, the ion beam is deflected toward the ground potential side of the deflecting electrode by the pulse voltage applied to the deflecting electrode 15 when the electron accelerating voltage is below the carrier gas emergence voltage. The deflected ion beam is detected by a total ion monitor 16, such as an electron multiplier disposed on the path of the deflected ion beam. Then the detected result is recorded as a gas chromatogram on the recorder.

When the electron accelerating voltage is above the carrier gas emergence voltage, the deflecting electrode 15 is kept at ground potential and, therefore, the ion beam is not deflected but is directed to the magnetic field 8, whereby the ion beam is dispersed with respect to mass and detected by the ion collector 10 via the collector slit 9, and thus the mass spectrum is recorded.

It is now apparent that the ion beam incident on the total ion monitor 16 does nto contain ions of the carrier gas, and, hence, no drift is caused in the base line of the gas chromatogram obtained through the total ion monitor even if the flow of the carrier gas is varied due to temperature rise.

According to the invention, the sample gas is ionized at an electron accelerating voltage higher than 50V. By using these ions, a mass spectrum is obtained via the ion collector. As a result, the spectrum is free of influences due to decrease in the quantity of ions when the electron accelerating voltage is set at a value below the carrier gas emergence voltage.

Figure 3:
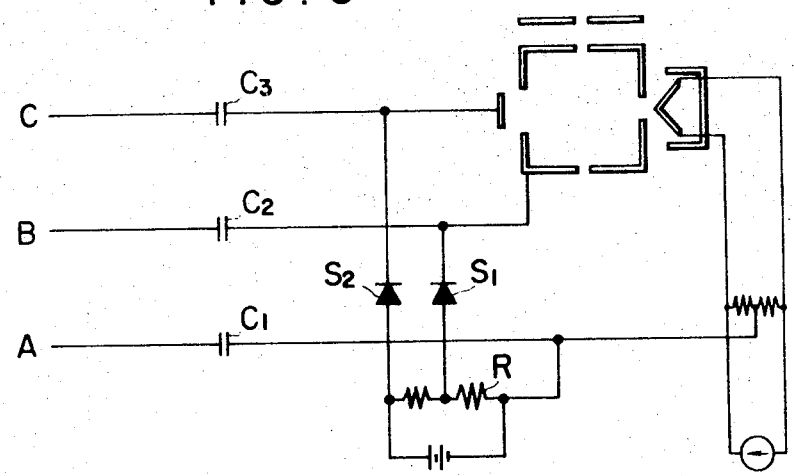
FIG. 3 illustrates an embodiment of this invention wherein a pulse voltage is applied to an electron accelerator disposed in the ionizing means.

In the above embodiment, the electron accelerating voltage is selected at two levels, 20V and 70V. Instead, a pulse of 50V may be added to a DC voltage of 20V. FIG. 3 shows a circuit in which a 50V pulse is added to a 20V DC voltage. The terminal A stands at zero potential. A positive pulse of 50V is applied between the terminals A and B, and a positive pulse of 80V between the terminals A and C. The purpose of the capacitor $C_1$ is to block direct current and thus to keep the reference potential of the ionization chamber high, so as to sufficiently accelerate the ion.

The capacitors $C_2$ and $C_3$ are to block DC and to bias the input pulses at a certain specific voltage. When the voltage applied across the terminals A and B is zero, the 20V across the resistor $R_1$ is applied to the ionization chamber 1 via the diode $S_1$ and, at the same time, the capacitor $C_2$ is charged. When the voltage applied between the terminals A and B is changed to 50V, the voltage of 20V across the capacitor $C_2$ is added forward, and the resultant voltage of 70V is applied to the ionization chamber 1. In other words, the voltage applied between the filament 6 and ionization chamber is changed in the range between 20V and 70V according to the pulse between the terminals B and C. Therefore, when a pulse of 50V is applied between the terminals B and C in synchronism with the pulse applied to the beam deflecting plate 15, the electron accelerating voltage is changed in synchronism with the deflecting operation of the deflecting plate 15.

Briefly, in the foregoing embodiment wherein the mass spectrometer is used in direct combination with a gas chromatograph, the electron accelerating voltage is a square-wave pulse voltage having two levels, one being below the carrier gas emergence voltage and the other being above the carrier gas emergence voltage. A voltage sufficient to deflect the ion beam is applied to the deflecting electrode disposed at a position along the ion beam path in synchronism with said square-wave pulse voltage when said electron accelerating voltage is below the carrier gas emergence voltage, or said deflecting electrode is kept as ground potential when said accelerating voltage is above the carrier gas emergence voltage whereby drift is eliminated from the base line of the chromatogram recorded according to the ions detected by the ion monitor.

The invention is not limited to the above example with respect to the method of producing the square-wave pulse voltage used as the electron accelerating voltage, or the method of generating the deflecting voltage synchronized with said square-wave pulse voltage applied to the deflecting electrode. It is apparent that any modification may be made regarding these methods without departing the true spirit of this invention.

The distribution ratio of the ions directed to the total ion monitor and to the analyzing system may arbitrarily be determined by changing the pulse widths $t_1$ and $t_2$ (FIG. 1) of the square-wave voltage $E_3$.

In the above embodiment, the ion beam is formed of positive ions. Instead, the ion beam may be made up of negative ions for the purpose of this invention.

In the foregoing embodiments, the single convergence type mass spectrometer is described, and the deflecting electrode is located immediately after the exit slit of the ion source. It is apparent that the invention is applicable to the double convergence type mass spectrometer utilizing the velocity convergence of ions in an electrostatic field and the directional convergence of ions in a in a magnetic field. In this case, the deflecting electrode may be located at a suitable position between the electrostatic field and magnetic field.

As described above, the invention employs the method in which the ion beam is intermittently supplied to the ion monitor for monitoring and detecting the ions. According to this method, an electron multiplier whose sensitivity and amplification factor are very large can be used for the ion monitor, and the ion monitor can be located away of the main beam path. Thus, undesirable influences due to deflection of the main beam by the high voltage applied between the electrodes of said electron multiplier are eliminated, unlike the conventional method in which a collector plate is disposed on the ion beam path, and part of the ion beam is cut and amplified by a current amplifier.

What is claimed is:

1. In an apparatus for mass spectrum determination comprising an ionization chamber including means for generating an ion beam from a gas and means for accelerating said ion beam along a beam path,
   a magnetic analyzer disposed along said beam path,
   indicator means for obtaining a mass spectrum of said gas from the ions derived from said magnetic analyzer,
   the improvement comprising a detector disposed adjacent said ion beam path, deflecting means disposed between said ionization chamber and said magnetic analyzer to deflect ions from the ion beam toward said detector for ion monitoring, and means for supplying a pulse voltage to said deflecting means to direct portions of said ion beam alternately to said ion detector and said magnetic analyzer.

2. An apparatus in accordance with claim 1, wherein said detector is an electron multiplier.

3. An apparatus in accordance with claim 1, wherein the pulse width of the pulse voltage applied to the deflecting means is variable whereby the quantity of the ion introduced into the monitor means may be controlled.

4. In an apparatus for mass spectrum determination comprising: a gas chromatograph, ionization means for ionizing a gas sample to form an ion beam projected along a beam path, means for introducing a gas sample into said ionization means from said gas chromatograph, a magnetic analyzer disposed along said beam path, and an indicator for obtaining a mass spectrum of said gas sample,
   the improvement comprising monitor means for detecting ions, deflecting means disposed at a suitable position between said magnetic analyzer and said ionization means for deflecting said ion beam from said beam path toward said monitor means for measuring a gas chromatograph, and means for supplying a pulse voltage to said deflecting means to direct portions of said ion beam alternately to said magnetic analyzer and said monitor means.

5. An apparatus in accordance with claim 4, wherein said ionization means includes an electron beam generator and an electron accelerator, the accelerating voltage of the electron accelerator disposed in the ionization means being variable.

6. An apparatus in accordance with claim 4, wherein the accelerating voltage of the electron accelerator disposed in the ionization means is changed in two levels, one being higher and the other being lower than the voltage for ionizing the carrier gas introduced thereinto from said chromatograph.

7. An apparatus in accordance with claim 6, wherein the electron accelerating voltage is changed in synchronism with the pulse voltage applied to the deflecting means, when the ion beam is deflected by the deflecting means, the electron accelerating voltage is set at a value lower than the voltage at which the carrier gas is ionized, and when the ion beam is free of the deflecting means, the electron accelerating voltage is set at a value higher than the voltage at which the carrier gas is ionized.

8. An apparatus in accordance with claim 7, wherein said monitor means includes an electron multiplier.

9. In an apparatus for mass spectrum determination comprising:
- a gas chromatograph,
- ionization means for ionizing a gas sample to form an ion beam projected along a beam path,
- means for introducing a gas sample into said ionization means from said gas chromatograph,
- a magnetic analyzer disposed along said beam path,
- an indicator for obtaining a mass spectrum of said gas sample, and monitor means for ions, the improvement comprising
- deflecting means disposed at a suitable position between said magnetic analyzer and said ionization means for deflecting portions of said ion beam alternately to said magnetic analyzer and said monitor means and means for supplying an alternating voltage to said deflecting means.

10. An apparatus in accordance with claim 9, wherein said monitor means has an electron multiplier at a position distant from the main beam path where the main ion beam cannot be affected by a high voltage applied between electrodes of said multiplier.

* * * * *

UNITED STATES PATENT OFFICE
CERTIFICATE OF CORRECTION

Patent No. 3,764,803                     Dated October 9, 1973

Inventor(s) Yasuo Nakajima

It is certified that error appears in the above-identified patent and that said Letters Patent are hereby corrected as shown below:

Column 2, line 34, delete "by" and insert --independent of--.

Signed and sealed this 27th day of August 1974

(SEAL)
Attest:

McCOY M. GIBSON, JR.　　　　　　　　　　C. MARSHALL DANN
Attesting Officer　　　　　　　　　　　　Commissioner of Patents